Figure 1:
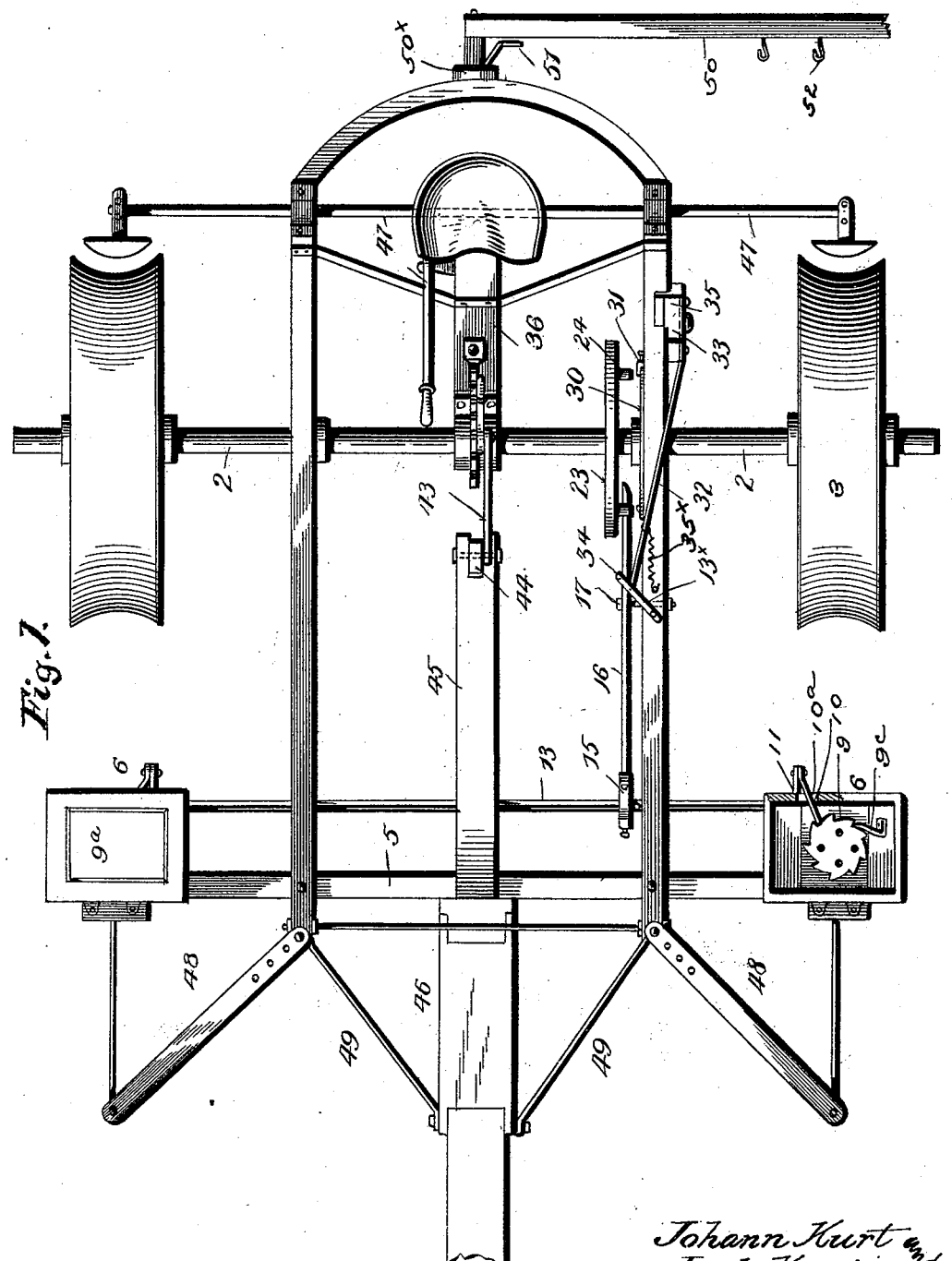

(No Model.) 2 Sheets—Sheet 1.

JOHANN KURT & JACOB KURT.
CORN PLANTER.

No. 518,960. Patented May 1, 1894.

Witnesses:
L. C. Hills.
Robt. Niton

Johann Kurt and
Jacob Kurt,
Inventors;
by Wm. N. Moore,
Atty.

(No Model.) 2 Sheets—Sheet 2.
JOHANN KURT & JACOB KURT.
CORN PLANTER.
No. 518,960. Patented May 1, 1894.
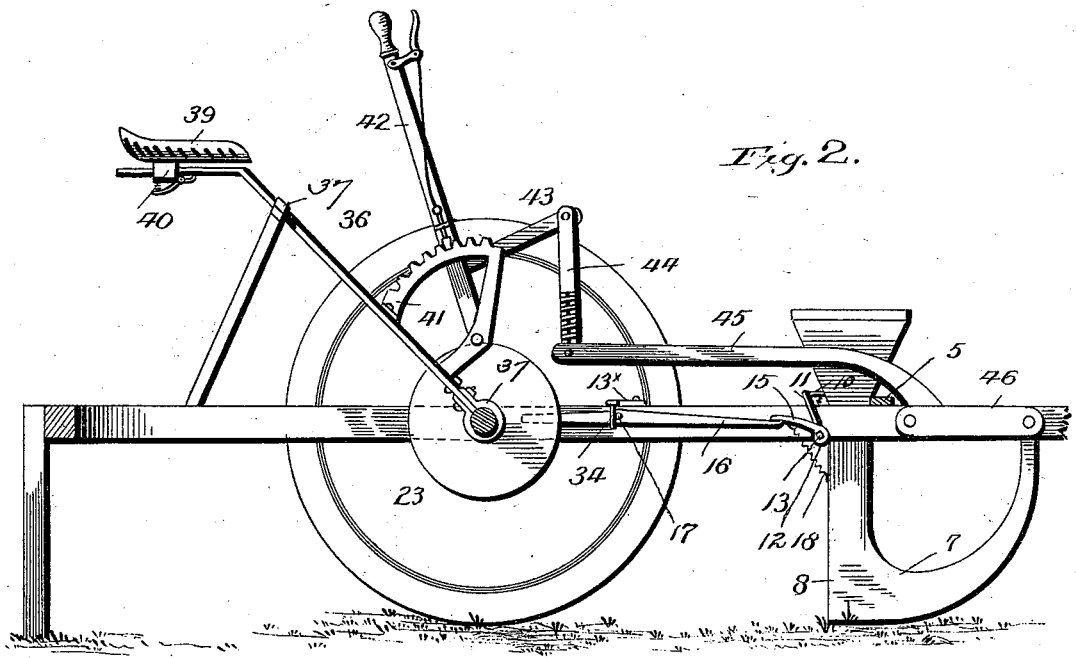
Fig. 2.
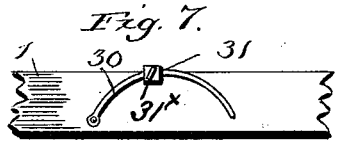
Fig. 7.
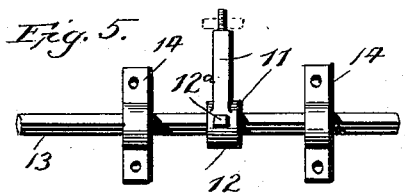
Fig. 5.
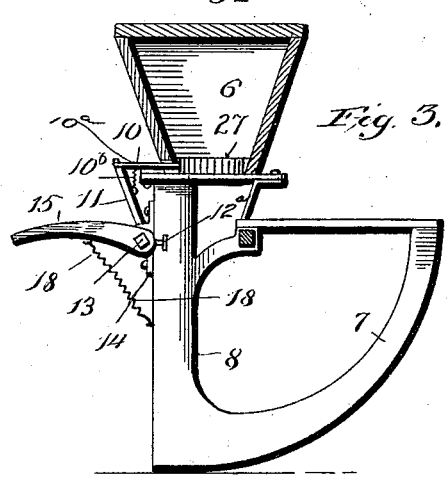
Fig. 3.
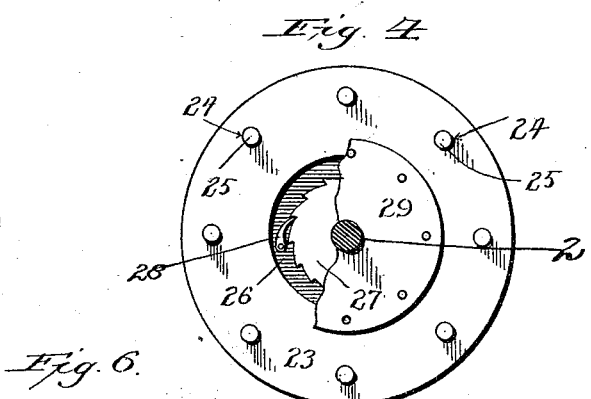
Fig. 4.
Fig. 6.
Witnesses:
L. C. Hills
Robt. Aiton
Johann Kurt and
Jacob Kurt,
Inventors:
by Wm. N. Moore,
Atty.
THE NATIONAL LITHOGRAPHING COMPANY,
WASHINGTON, D. C.

UNITED STATES PATENT OFFICE.

JOHANN KURT AND JACOB KURT, OF RICHWOOD, OHIO.

CORN-PLANTER.

SPECIFICATION forming part of Letters Patent No. 518,960, dated May 1, 1894.

Application filed August 23, 1893. Serial No. 483,864. (No model.)

*To all whom it may concern:*

Be it known that we, JOHANN KURT and JACOB KURT, citizens of the United States of America, residing at Richwood, in the county of Union and State of Ohio, have invented certain new and useful Improvements in Corn-Planters, of which the following is a specification, reference being had therein to the accompanying drawings.

Our invention relates to certain improvements in double row corn planters and has for its object to provide a device of this character of a simple and inexpensive construction which shall present certain novelties and advantages over other planters of this character heretofore in use all as will be hereinafter fully set forth.

The novel features of our invention will be carefully defined in the claims.

In the accompanying drawings which serve to illustrate our invention—Figure 1 is a plan view of a corn planter embodying our improvements, the cover of the seed hopper at one side being removed to better show the inclosed parts and Fig. 2 is a longitudinal section of the same. Figs. 3 and 4 are enlarged detail views to be hereinafter referred to. Figs. 5, 6 and 7 represent detail views of parts of the planter on an enlarged scale.

In the views 1 represents the frame, of the usual or any preferred form, provided at its rear end with the axle 2, and bearing the wheels 3, 3. Wheel scrapers 47, of any preferred construction are also provided. At its forward end the frame is provided with a cross beam 5, on which is mounted on each side of the frame one of the seed hoppers 6 provided with conductors 8 and runners or furrow openers 7, of ordinary construction.

9, are the seed disks and they are provided with hoppers fitting entirely over them. The seed disks 9 are operated by pawls 10 playing through slots or eyes 10ᵃ in the lower portions of the hoppers, which slots are arranged in such a position and are of such form as seen in the sectional view Fig. 3, as to hold said pawls down in proper position for engaging the teeth of said ratchet wheels 9, and prevent the same from springing up over the said teeth.

10ᵇ is a spring acting on the pawl 10 as seen in Fig. 3.

The pawls 10 are coupled at their outer ends to arms 11 having collars 12 at their lower ends, which collars are movably mounted on the squared rock shaft 13 extending transversely of the frame. The collars 12 are each provided with set screws 12ᵃ and the shaft 13 is mounted in brackets 14, two of which are mounted on each hopper, on opposite sides of the respective collars 12, bearings being also provided for said shaft in frame 1. A spring detent 9ᶜ is also provided, which by engagement with the teeth of feed disk 9 prevents back rotation of the same. Journaled to the conductors is the cross shaft 13, and a rearwardly projecting arm 15 is arranged on said shaft 13, with the under side of which arm 15 engages the forward end of a lever 16 pivoted to the frame at 17. The arm 15 is provided with a retracting spring 18 as seen in Fig. 2.

Mounted on the axle 2 inside the frame is a disk 23 provided with an annular series of apertures 24 for the reception of pins or plugs 25 which are arranged to travel as the disk 23 rotates, in the plane of the rear end of lever 16 and to engage therewith, whereby the shaft 13 may be rocked and the feed mechanism of the hoppers 6 operated to plant the seed. The plugs 25 are provided with heads and have their opposite ends screw threaded and provided with nuts, as seen, whereby they may be secured in apertures 24. The disk 23 is provided with a central recess 26 in one side in which recess is arranged a small ratchet wheel 27 keyed fast to the axle 2 and adapted to communicate the movement of the axle to said disk 23 by means of a spring pawl 28 arranged in the recess 26 and engaging the teeth of the ratchet wheel, as clearly seen in Fig. 4, said recess 26 being covered by a thin metal plate 29, bolted fast to the disk 23. In this manner, it will be seen that the ratchet wheel communicates the motion of the axle to the disk 23 when the planter is moving across the field, but said disk 23 may be rotated forward the pawl 28 passing loosely over the teeth for purposes which will be hereinafter explained.

Mounted on the frame is a bent wire 30 bent to a semi-circular form concentric with and arranged opposite to the series of apertures in the disk 23 and on this wire is slidingly mounted a small block 31 adapted to be set fast by means of a set screw 31$^\times$. The object of this sliding block and bent wire is to regulate the end settings or plantings of the machine, for which purpose the runners and conductors of the hoppers are first lifted above the ground on entering the field so that the first seed will be dropped on the surface of the ground. The runners are then lowered and the planter driven across the field in the usual manner. The means for thus lifting and lowering the runners will be hereinafter described. At the end of the furrow, the runners and conductors are again lifted so that the last setting will be dropped on the surface. Before the machine is turned for the next furrow, the block 31 is slid along the wire 30 to a position opposite the next pin or plug 25. When the planter is in position for returning along the next furrow, the disk 23 is turned forward until one of the pins 25 comes opposite said block 31, after which the first setting is also dropped on the surface. Thus it will be seen that the beginning and end of each furrow is gaged and the dropping of the seed in check rows is assured.

To the upper part of one of the longitudinal rails of the frame is pivoted one end of the horizontal lever 13$^\times$, having a depending lug 34, bearing against the inner face of lever 16, and to the lever 13$^\times$ near the lug 34, is connected one end of the rod 32, the other end whereof is connected to the lower end of the lever 33, having the extension 35, which limits the movement of the lever, while it is held in the proper position by the spring 35$^\times$. From this construction it will be seen that normally the lever 16 is held in the path of movement of the plugs 25 and will be struck by said plugs which action operates the feeding devices through shaft 13, and the pawls 10, to plant the seed. When it is desired to throw the lever 16 out of operation, the lever 33 is tilted upward, (by the hand or foot) and it draws the rod 32 in and causes the lug 34, on lever 13$^\times$, to push the lever 16 in out of the way of movement of the plugs 25 and consequently throw the seed planting devices out of operation.

The seat bar 36 is composed of a flat steel spring fixed to the axle by a split-collar 37 and supported at its upper end by a V brace fixed to the frame. The seat 39 is slidingly mounted on the rear end of this spring bar and may be set at any desired position by means of a latch 40 entering recesses in the horizontal portion of the spring bar.

41 is the segment rack fixed to the seat spring bar and bearing the lever 42 of ordinary construction, said lever being provided with the arm 43 extending forward and coupled at its end to the upper end of a link 44, the lower end of which has a spring connection with the rear end of a rearwardly projecting arm 45 formed integrally on the plate 46 which is mounted on the tongue. Thus it will be seen that by operating the lever 42 the runners may be elevated clear of the ground when the planter is not in use or when it is desired to clear rocks or stumps in the field.

In order to steady the forward ends of the runners we have provided the braces 48 adjustably connected to the front end of the frame and in order to steady the said front ends of the frame we have provided the oblique braces 49 pivoted at their rear ends to the front ends of the frame and at their front ends to the sides of the tongue.

To the rear of the machine is pivoted the inner end of the marker 50, carrying the hooks 52, and when it is desired to elevate and hold the marker out of use (as at the end of a row when turning the machine), we provide the support 51, mounted in the lug 50$^\times$. This support can be moved in out of the way of the marker and out to have the outer end rest against the under face of the marker and thus support the marker when not in use.

Having thus described our invention, we claim—

1. In a corn planter, the combination with a supporting frame, an axle journaled in the supporting frame and having carrying wheels mounted thereon, and hoppers arranged on the frame in advance of the axle, of toothed feed disks arranged in the hoppers, a rock shaft journaled in the supporting frame and provided with a rearwardly extending arm, upwardly extending arms carried by said shaft, supporting pawls adapted to take into the teeth on the feed disks in the hoppers, a disk secured on the axle and provided on one face with a series of laterally projecting studs or pins, and a lever fulcrumed on the supporting frame and having its ends extending into the paths of the studs on the disk on the axle and the rearwardly extending arm on the rock shaft, substantially as and for the purpose described.

2. In a corn planter, the combination with a supporting frame, an axle journaled in the frame and having suitable carrying wheels mounted thereon, and hoppers carried by the supporting frame in advance of the axle, of feeding disks arranged in the hoppers, a rock shaft journaled in the supporting frame and provided with a rearwardly extending arm, means for operating the feed disks from the rock shaft, a disk secured on the axle and provided on one face with a series of laterally projecting studs or pins, a lever fulcrumed on the side of one member of the supporting frame and having its ends extending into the paths of the studs on said disk and the rearwardly extending arm on the rock shaft, another lever fulcrumed on top of said member of the frame and provided on its under side with a pin which extends on one side of the lever by which the rock shaft is operated, and said lever thrown out of the path of the pins or studs and out of engagement with said rock-shaft; and a rod connecting the lever on the top of the supporting frame with a foot or hand lever fulcrumed in rear of the axle, substantially as and for the purpose described.

3. In a corn planter, the combination with a supporting frame, an axle journaled in said frame and having suitable carrying wheels mounted thereon, and hoppers carried by the supporting frame, of feed disks arranged in the hoppers and adapted to be operated from a rock shaft journaled in the supporting frame, a disk secured on the axle and provided with a series of laterally projecting studs or pins, a lever fulcrumed on the frame and having its ends extending into the paths of the pins on said disk and a rearwardly extending arm on the rock shaft, a guide attached to the supporting frame adjacent to the disk on the axle and extending concentric therewith, and a block adjustably fitted on said guide and adapted to be held at any desired point thereon by a set screw, substantially as and for the purpose described.

In testimony whereof we affix our signatures in presence of two witnesses.

JOHANN KURT.
JACOB KURT.

Witnesses:
JAMES A. HUGGERT,
J. F. MILLAR.